Oct. 6, 1931.                W. S. VALMORE                1,826,158
                             VALVE MECHANISM
                            Filed Dec. 7, 1928

Inventor
William S. Valmore
By Hull, Brock West
Attorney

Patented Oct. 6, 1931

1,826,158

UNITED STATES PATENT OFFICE

WILLIAM S. VALMORE, OF MANSFIELD, OHIO

VALVE MECHANISM

Application filed December 7, 1928. Serial No. 324,423.

This invention relates generally to a valve mechanism and more particularly to a valve mechanism which is especially adapted for use in connection with a radiator or other portion of a heating unit.

The main object of the invention is to provide a valve mechanism which requires no packing or glands and which will effectively prevent leakage.

A further object of the invention is to provide a valve mechanism in which the valve proper is actuated by means of a flexible diaphragm and in which the valve seat is of such size as to permit the maximum flow through the valve when the valve is opened or removed from its seat a comparatively short distance.

A still further object of the invention is to provide a valve mechanism of the character described which is simple in construction, comprises comparatively few parts which are readily assembled and disassembled and is well adapted for quantity production at comparatively low cost.

Figure 1:
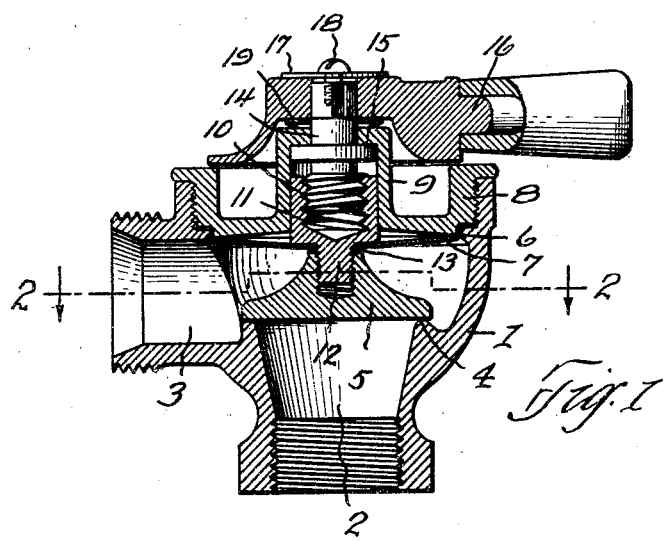
Figure 2:
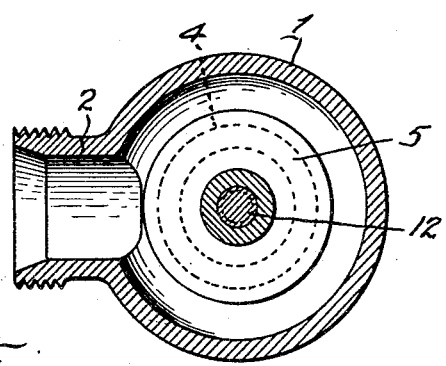

Further and more limited objects of the invention will appear as the description proceeds and by reference to the accompanying drawings in which Fig. 1 is a vertical sectional view of the valve body and valve actuating mechanism and Fig. 2 is a horizontal sectional view on the line 2—2 of Fig. 1.

Referring now to the drawings, the valve mechanism consists essentially of a valve casing or body 1 having an inlet passageway 2 leading thereinto and an outlet passageway 3 leading therefrom. The valve casing is provided with an annular upstanding projection 4 which provides a valve seat. This valve seat 4 is considerably larger than either the inlet or outlet passageway and is adapted to receive a valve 5 thereon. The upper end of the casing is open and is provided with an annular inwardly projecting flange or shoulder 6 which is adapted to receive thereon a diaphragm 7. The upper end of the casing is interiorly threaded and adapted to receive therein a valve bonnet 8 which serves to hold the diaphragm in place. The valve bonnet 8 has a hollow annular upstanding portion 9 in which is slidably mounted a valve stem 10 comprising a plug having a threaded opening or socket 11 therein. The valve stem 10 also has a projecting portion 12 thereon which extends through a centrally disposed opening in the diaphragm 7 and is threadedly secured to the valve 5, as shown most clearly in Fig. 1.

A washer 13 is interposed between the valve member 5 in the lower face of the diaphragm. Threadedly secured in the socket 11 of the valve stem 10 is a member 14 having an annular flange or shoulder 15 thereon which has a working fit within the hollow annular projection 9 and which projects through an opening in the top portion thereof. The upper end of the member 14 is square or hexagonal in cross section and receives thereover a valve actuating lever 16 which is secured thereto by means of a disk 17 and screw 18. A washer 19 is interposed between the valve actuating lever 16 and the top portion of the projection 9. The inner face of the valve bonnet 8 is dished outwardly as shown most clearly in Fig. 1 so that when the diaphragm is flexed outwardly to open the valve a reinforcement will be provided to prevent undue strain upon the diaphragm.

As the valve 5 and valve stem 10 are rigidly and non-rotatably connected with the diaphragm, it will be seen that when the member 14 is rotated by means of the valve lever 16, the valve stem 10 will be moved either inwardly or outwardly, depending upon the direction of rotation of the valve lever, and thus cause a flexing of the diaphragm either inwardly or outwardly. The valve bonnet 8 secures the diaphragm in place and provides a construction in which no leakage will occur and which will render unnecessary any packing or glands.

The valve seat 4 is of greater diameter than either the inlet passageway 2 or the outlet passageway 3 and is therefore of greater cross sectional area thereby permitting a maximum flow through the casing when the valve is moved from its seat only a relatively short distance. For example, if the inlet and outlet passageways are ¾ inch openings, the valve seat should be 1¼ inches in diameter. With these dimensions, it will be necessary to lift the valve from its seat only $\frac{3}{32}$ of an inch to permit maximum flow through the casing. It has been found that these proportions give the most efficient results. The shape of the inner face of the valve bonnet also serves to provide a construction in which the diaphragm is reinforced when the valve is opened and also prevents the diaphragm from being flexed outwardly too far.

It will now be clear that I have provided a valve mechanism which will accomplish the objects of the invention as hereinbefore stated. Various changes may be made in the details of construction and in the shape, size and arrangement of the various parts without departing from the spirit of my invention and it is to be understood that the embodiment of the invention herein disclosed is merely illustrative and not to be considered in a limiting sense and my invention is to be limited only in accordance with the scope of the appended claims.

Having thus described my invention, what I claim is:

A valve mechanism comprising a casing having a valve chamber therein, an inlet passageway leading into said valve chamber, an outlet passageway leading from said valve chamber, an annular valve seat formed integral with said casing, a valve adapted to be moved into engagement with said valve seat, a peripheral shoulder formed on said valve casing and defining a diaphragm seat, a diaphragm resting on said diaphragm seat, a valve bonnet comprising a plug threadedly secured in the upper end of said casing and holding said diaphragm in place and having a centrally disposed hollow annular, upstanding portion, a plug slidably and non-rotatably mounted in said portion and having a threaded opening therein, said plug extending through said diaphragm and threadedly connected with said valve, a valve stem threadedly secured in said plug and having an annular flange thereon having a working fit within the upstanding portion of said plug and a valve handle non-rotatably secured to said valve stem.

In testimony whereof, I hereunto affix my signature.

WM. S. VALMORE.